United States Patent
Scales et al.

(10) Patent No.: US 7,191,285 B2
(45) Date of Patent: Mar. 13, 2007

(54) CONFIGURING MEMORY FOR A RAID STORAGE SYSTEM

(75) Inventors: William James Scales, Fareham (GB); Howard Charles Rankin, Eastleigh (GB); Nicholas Michael O'Rourke, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 10/806,620

(22) Filed: Mar. 23, 2004

(65) Prior Publication Data
US 2004/0225926 A1 Nov. 11, 2004

(30) Foreign Application Priority Data
Apr. 26, 2003 (GB) ................... 0309538.7

(51) Int. Cl.
G06F 12/02 (2006.01)
G06F 13/10 (2006.01)

(52) U.S. Cl. .................. 711/114; 711/171; 714/718

(58) Field of Classification Search ...................... None
See application file for complete search history.

(56) References Cited

U.S. PATENT DOCUMENTS

| | | | |
|---|---|---|---|
| 5,615,335 A | 3/1997 | Onffroy et al. | 395/183.06 |
| 6,567,889 B1 | 5/2003 | DeKoning et al. | 711/114 |
| 6,629,158 B1 * | 9/2003 | Brant et al. | 710/10 |
| 6,687,765 B2 * | 2/2004 | Surugucchi et al. | 710/15 |
| 2002/0095532 A1 | 7/2002 | Surugucchi et al. | 710/5 |
| 2003/0135609 A1 * | 7/2003 | Carlson et al. | 709/224 |

FOREIGN PATENT DOCUMENTS

| | | |
|---|---|---|
| EP | 0714063 B1 | 2/2002 |
| JP | 8-328759 | 12/1996 |
| JP | 10-333838 | 12/1998 |

OTHER PUBLICATIONS

"A Case for Redundant Arrays of Inexpensive Disks (RAID)", David A. Patterson, et al., Univ. of California, Dept. of Electrical Engineering and Computer Sciences, 13 pages.

* cited by examiner

*Primary Examiner*—Gary Portka
(74) *Attorney, Agent, or Firm*—Harrington & Smith, LLP

(57) ABSTRACT

The present invention relates to an apparatus having a memory operable with a virtualised RAID controller to determine an optimum I/O configuration by testing performance characteristics of a plurality of I/O operations.

16 Claims, 3 Drawing Sheets

CONFIGURING MEMORY FOR A RAID STORAGE SYSTEM

FIELD OF THE INVENTION

This invention relates to configuring memory for a RAID storage system and more particularly to configure memory for a RAID storage system including a virtualised RAID controller and a detached memory.

BACKGROUND OF THE INVENTION

In storage systems an array of independent storage devices can be configured to operate as a single virtual storage device using a technology known as RAID (Redundant Array of Independent Disks). A computer system configured to operate with a RAID storage system is able to perform input and output (I/O) operations (such as read and write operations) on the RAID storage system as if the RAID storage system were a single storage device. A RAID storage system includes an array of independent storage devices and a RAID controller. The RAID controller provides a virtualised view of the array of independent storage devices—this means that the array of independent storage devices appear as a single virtual storage device with a sequential list of storage elements. The storage elements are commonly known as blocks of storage, and the data stored within them are known as data blocks. I/O operations are qualified with reference to one or more blocks of storage in the virtual storage device. When an I/O operation is performed on the virtual storage device the RAID controller maps the I/O operation onto the array of independent storage devices. In order to virtualise the array of storage devices and map I/O operations the RAID controller may employ standard RAID techniques as discussed in the paper "A Case for Redundant Arrays of Inexpensive Disks (RAID)" (D. Patterson et. al., 1988). Some of these techniques are considered below.

In providing a virtualised view of an array of storage devices as a single virtual storage device it is a function of a RAID controller to spread data blocks in the virtual storage device across the array. One way to achieve this is using a technique known as Striping. Striping involves spreading data blocks across storage devices in a round-robin fashion. When storing data blocks in a RAID storage system, a number of data blocks known as a strip is stored in each storage device. The size of a strip may be determined by a particular RAID implementation or may be configurable. A row of strips comprising a first strip stored on a first storage device and subsequent strips stored of subsequent storage devices is known as a stripe. The size of a stripe is the total size of all strips comprising the stripe. The use of multiple independent storage devices to store data blocks in this way provides for high performance I/O operations when compared to a single storage device because multiple storage devices can act in parallel during I/O operations.

Physical storage devices such as disk storage devices are renowned for poor reliability and it is a further function of a RAID controller to provide a reliable storage system. One technique to provide reliability involves the storage of check information along with data in an array of independent storage devices. Check information is redundant information that allows regeneration of data which has become unreadable due to a single point of failure, such as the failure of a single storage device in an array of such devices. Unreadable data is regenerated from a combination of readable data and redundant check information. Check information is recorded as parity data which occupies a single strip in a stripe, and is calculated by applying the EXCLUSIVE OR (XOR) logical operator to all data strips in the stripe. For example, a stripe comprising data strips A, B and C would be further complimented by a parity strip calculated as A XOR B XOR C. In the event of a single point of failure in the storage system, the parity strip is used to regenerate an inaccessible data strip. For example, if a stripe comprising data strips A, B, C and PARITY is stored across four independent storage devices W, X, Y and Z respectively, and storage device X fails, strip B stored on device X would be inaccessible. Strip B can be computed from the remaining data strips and the PARITY strip through an XOR computation. This restorative computation is A XOR C XOR PARITY=B.

For check information to be effective in the event of a failure it is necessary that it is accurate and maintained. Changes to data in a RAID storage system must therefore be reflected by appropriate changes to check information. This can be burdensome where changes to data affect a data unit smaller than the size of an entire stripe (known as a "small write") for the reason described below. Consider a RAID storage system with a RAID controller using the striping technique, with each stripe comprising data strips and a parity strip. If such a system is configured such that a single block in a virtual view of the storage system (a virtual storage device) corresponds to a single data strip, a write operation of a single block to the virtual storage device is implemented by the RAID controller as a write operation of a single strip in a RAID stripe. The change of a single strip in a stripe must be reflected by appropriate changes to a corresponding parity strip. Thus the parity strip for the stripe must be recalculated. To recalculate the parity strip, the data strip being overwritten in the stripe (the "old" data strip) must be excluded from the existing parity data. This can be achieved by performing an XOR operation on the parity data and the old data strip. Furthermore, the replacement data strip (the "new" data strip) must be included in the parity data to create a modified parity strip. This can be achieved by performing an XOR operation on the parity data and the new data strip. Subsequently, the modified parity strip and the new data strip must be written within the stripe. Thus in order to write a replacement strip to an existing stripe it is necessary to perform the following operations: two read operations (of the old data strip and the parity strip); a modification of the parity strip; and two write operations (of the new data strip and the modified parity strip). This approach to conducting a small write leads to a reduction in performance of a RAID storage system due to additional read and write operations required to maintain the consistency of check information. This is known as the read-modify-write problem for small write operations.

Due to the performance implications of small-write operations outlined above it is preferable to overwrite one or more complete stripes when writing to a RAID storage system to avoid the need to maintain existing check information. In order for a write operation to overwrite one or more complete stripes it is necessary that a unit of data to be written to the RAID storage system is of an appropriate size, being a multiple of the stripe size (excluding parity strips). To overwrite one or more complete stripes it is also necessary that a unit of data is written to a block in the virtual view of a RAID storage device corresponding to a first strip in a RAID stripe. A write operation to a block corresponding to any strip other than a first strip in a RAID stripe would include the writing of part of a stripe which is a small-write operation. Ensuring that a write operation corresponds to a first strip in a RAID stripe is known as "stripe alignment". Thus to ensure a write operation completely overwrites one or more RAID stripes it must meet stripe size and alignment criteria for a given RAID storage system. A write operation which satisfies these criteria is known as a "stripe aligned write". Stripe aligned writes do not require the maintenance of existing check information in RAID stripes because one or more stripes are completely replaced with newly written data and new check information is calculated for this new data as part of the write operation. Ensuring all write operations to a RAID storage system are stripe aligned improves performance by removing the read-modify-write problem of small-writes.

Write operations to a RAID storage system will not always be stripe aligned, and small write operations will never be stripe aligned as by definition a small write operation involves a data unit smaller in size than a complete RAID stripe. Existing RAID storage systems may employ a memory, such as a cache, in which multiple small write operations are collected into a single write operation constituting a complete stripe. Subsequently a collection of small writes can be stripe aligned and written to a RAID storage device. For such a cache memory to be effective it must be configured to operate within the parameters of a RAID storage system including the stripe size and alignment. These parameters may be different for different RAID storage systems, and are typically different for RAID storage systems provided by different vendors. Often cache memory is integrated within a RAID controller so that it is easily configured with appropriate stripe size and alignment parameters by a user or by the controller itself.

Increasingly, RAID storage systems are themselves becoming virtualised in configurations such as storage area networks (SANs). A SAN comprises a network linking one or more servers to one or more storage devices. Storage devices in a SAN may include virtual storage devices implemented as RAID storage systems. Within a SAN one or more switches connect devices and provide routes through the SAN between hosts and storage devices. A SAN virtualises storage devices to ensure interoperability of devices connected to the SAN. It is a feature of the virtualisation of storage devices in a SAN that actual implementation details of a storage device may be unknown to other devices in the SAN. For example, hosts in a SAN may be unable to determine whether a storage device attached to the SAN is implemented as a single disk or a RAID storage system. The virtualisation of storage devices in a SAN also allows the spreading of data across many storage devices, including many RAID storage systems, to further improve performance and reliability. This is achieved using a storage appliance, such as IBM's TotalStorage Virtualization Engine, which can be attached to a switch in a SAN. It is desirable that cache memories are not integrated within storage devices such as RAID storage systems but are implemented independently within the SAN so that they can be used when data is spread across multiple SAN storage devices. For example, cache memory may be implemented within a storage appliance attached to a switch within the SAN.

Where a cache memory is not integrated with a RAID controller of a RAID storage system, and the RAID controller is virtualised such as through a SAN, specific stripe size and alignment characteristics of the RAID storage system are not readily available to the cache memory. The separation of a cache memory from a virtualised RAID controller leads to the problem that the cache memory cannot be automatically configured with appropriate stripe size and alignment characteristics because these characteristics are not known to the cache memory, and configuration must take place manually or not at all. The consequences of an inappropriate stripe size and alignment configuration include the increased likelihood that the read-modify-write problem is encountered as write operations are unlikely to be properly stripe aligned. It would thus be desirable to provide a system and method to alleviate these problems with conventional storage systems.

SUMMARY OF THE INVENTION

The present invention accordingly provides, in a first aspect, an apparatus having a memory operable with a virtualised RAID controller to determine an optimum I/O configuration by testing performance characteristics of a plurality of I/O operations wherein each of said I/O operations includes writing a block of data to the RAID controller, and wherein said I/O configuration includes a data length and a data alignment. This provides the advantage that write operations to the virtualised RAID controller of data stored in the memory are of an appropriate length and alignment to provide stripe aligned writes without encountering the read-modify-write problem.

Preferably the memory is a cache.

Preferably the performance characteristic is a response time.

The present invention accordingly provides, in a second aspect, a method for operating an apparatus having a memory operable with a virtualised RAID controller, comprising the steps of: performing a plurality of I/O operations wherein said I/O operations include writing a block of data to the RAID controller; testing a performance characteristic of said plurality of I/O operations; and responsive to said step of testing, setting an optimal I/O configuration for subsequent I/O operations wherein said I/O configuration includes a data length and a data alignment.

The present invention further provides, in a third aspect, a computer program product comprising computer program code stored on a computer readable storage medium which, when executed on a data processing system, instructs the data processing system to carry out the above method.

BRIEF DESCRIPTION OF THE DRAWINGS

A preferred embodiment of the present invention will now be described by way of example only, with reference to the accompanying drawings, in which.

DETAILED DESCRIPTION OF THE PREFERRED EMBODIMENT

Figure 1:
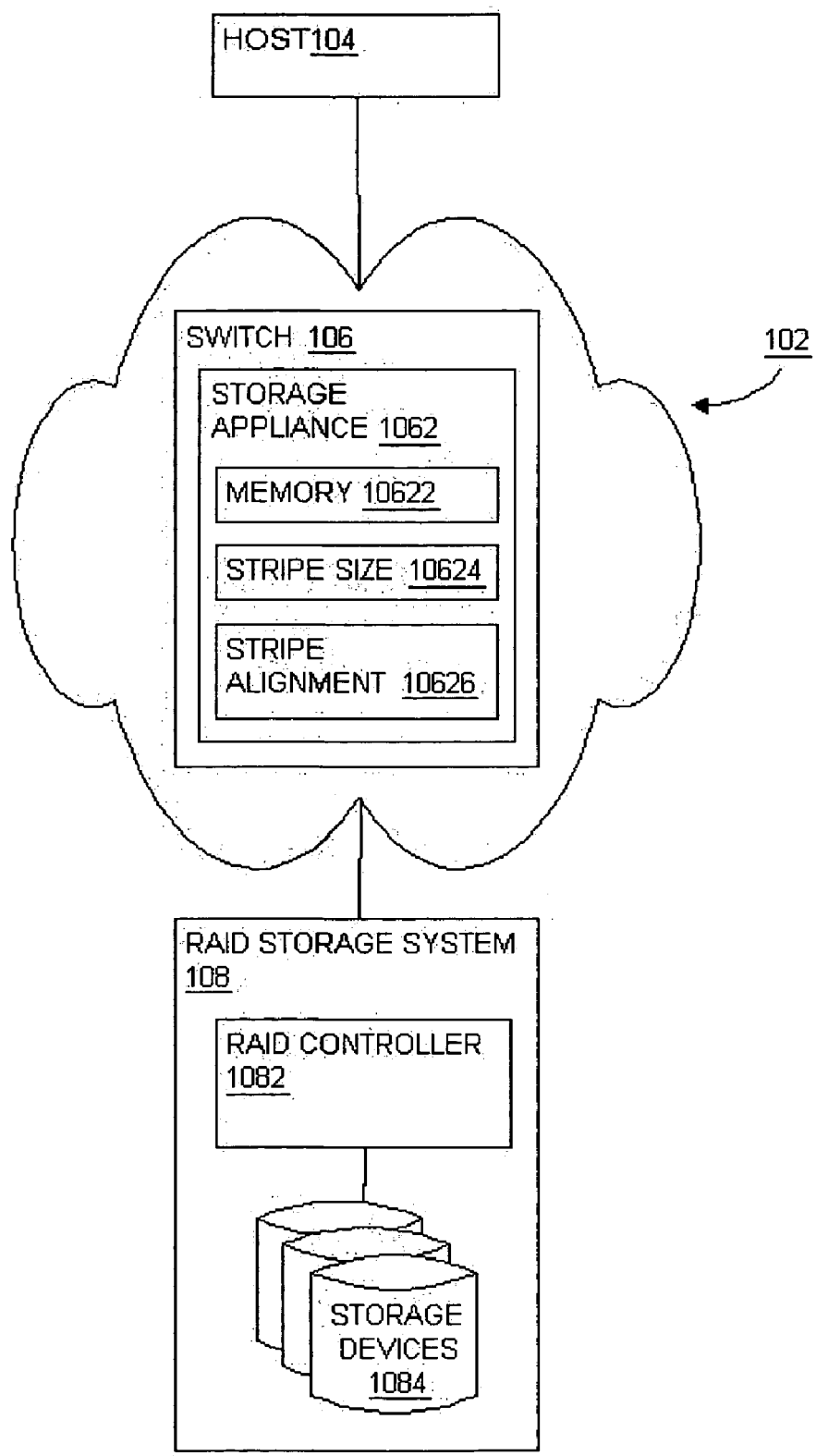
FIG. 1 is a schematic diagram illustrating a configuration of a storage area network (SAN) in a preferred embodiment of the present invention.

FIG. 1 is a schematic diagram illustrating a configuration of a storage area network (SAN) 102 in a preferred embodiment of the present invention. The SAN 102 includes a switch 106 comprising a storage appliance 1062. In the preferred embodiment storage appliance 1062 is IBM's TotalStorage Virtualization Engine. Storage appliance 1062 includes a memory 10622, a stripe size attribute 10624, and a stripe alignment attribute 10626. In the preferred embodiment memory 10622 is a cache. Alternatively, memory 10622 is an input buffer or an output buffer. Stripe size attribute 10624 and stripe alignment attribute 10626 are configuration parameters of the storage appliance 1062. SAN 102 connects a host 104 to a RAID storage system 108. In the preferred embodiment host 104 is a computer system. The RAID storage system 108 comprises a RAID controller 1082 and an array of storage devices 1084. In the preferred embodiment the array of storage devices 1084 is an array of disks. RAID controller 1082 uses striping to spread data across the array of storage devices 1084. RAID controller 1082 also maintains parity information for data stored on the array of storage devices 1084. Using these techniques, RAID controller 1082 provides reliable access to the array of storage devices 1084 as a single virtual storage device.

Figure 2:
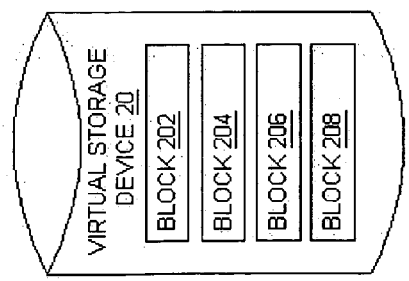
FIG. 2 is a schematic diagram illustrating an exemplary configuration of a virtual storage device.

FIG. 2 is a schematic diagram illustrating an exemplary configuration of a virtual storage device 20. The virtual storage device is not a physical storage device—rather it represents the array of storage devices 1084 presented to SAN 102 and host 104 by the RAID controller 1082. The virtual storage device 20 comprises a sequential list of storage blocks 202, 204, 206 and 208 which are elements of storage in each of which a fixed quantity of data is stored. Storage blocks 202, 204, 206 and 208 each have a storage capacity representing the number of bytes of data which they can store, and the storage capacity of each of storage blocks 202, 204, 206 and 208 is the same. The storage blocks 202, 204, 206 and 208 are striped across the array of storage devices 1084 by RAID controller 1082 as illustrated in FIG. 3 and explained below.

Figure 3:
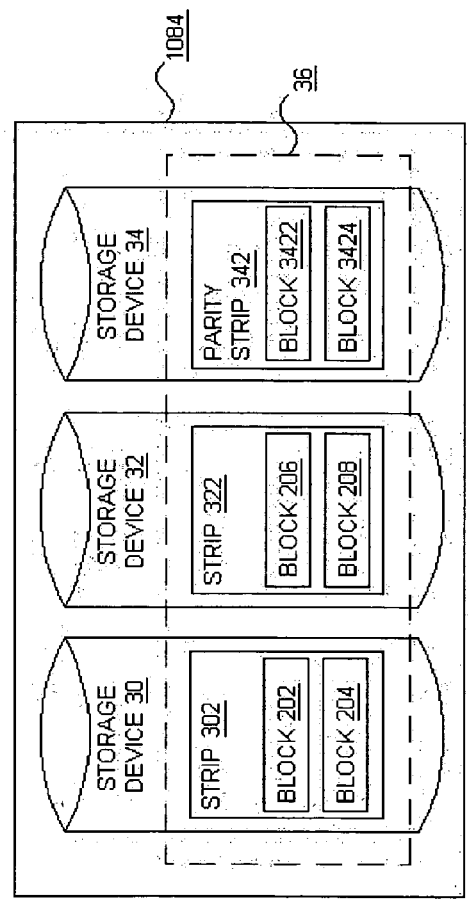
FIG. 3 is a schematic diagram illustrating an exemplary configuration of the array of storage devices of FIG. 1 across which the storage blocks of FIG. 2 are striped.

FIG. 3 is a schematic diagram illustrating an exemplary configuration of the array of storage devices 1084 of FIG. 1 across which the storage blocks 202, 204, 206 and 208 of FIG. 2 are striped. The array of storage devices 1084 comprises individual storage devices 30, 32 and 34. Data stored in the virtual storage device 20 is striped across the array of storage devices 1084 by the RAID controller 1082. A data stripe 36 comprises strips 302, 322 and a parity strip 342 stored on storage devices 30, 32 and 34 respectively. In the example configuration, strips 302, 322 and parity strip 342 each contain two blocks of storage. Consequently, the virtual storage device 20 is striped across the array of storage devices 1084 as follows: storage blocks 202 and 204 are stored in strip 302 on storage device 30; and storage blocks 204 and 206 are stored in strip 322 on storage device 32. Additionally, RAID controller 1082 maintains the parity strip 342 on storage device 34. The parity strip 342 comprises two storage blocks 3422 and 3424 in which parity data is stored. The parity data is calculated by the RAID controller 1082 using the exclusive OR (XOR) logical operator. The parity data stored within storage block 3422 is the XOR of both the data stored in storage block 202 and the data stored in storage block 206. The parity data stored in storage block 3424 is the XOR of both the data stored in storage block 204 and the data stored in storage block 208. In the event of a single point of failure, such as the failure of one of storage devices 30 or 32, the parity strip 342 can be used to regenerate a lost strip in stripe 36.

In operation, the host 104 is operable with the RAID storage system 108 such that host 104 is able to perform input and output (I/O) operations to and from the virtual storage device 20. I/O operations to and from the virtual storage device 20 take place through the switch 106 and the storage appliance 1062. The switch 106 directs the I/O operation to the storage appliance 1062 which uses memory 10622 to perform stripe aligned write operations on the virtual storage device 20. When storage appliance 1062 conducts an I/O operation on the virtual storage device 20, the RAID controller 1082 translates the I/O operation into an I/O operation on the array of storage devices 1084. The RAID storage system 108 and the RAID controller 1082 are said to be virtualised by the switch 106 and the storage appliance 1062 in the SAN 102.

Figure 4:
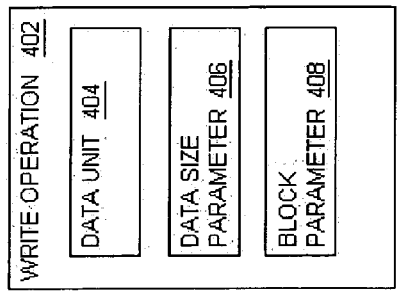
FIG. 4 is a block diagram illustrating the components of a write operation initiated by the storage appliance when writing to the virtual storage device.

FIG. 4 is a block diagram illustrating the components of a write operation 402 initiated by the storage appliance 1062 when writing to the virtual storage device 20. The write operation 402 includes a unit of data 404 to be written to the virtual storage device 20. The write operation 402 also includes a data size parameter 406. The value of the data size parameter 406 is a measure of the size of the unit of data 404 to be written to the virtual storage device 20 and may be expressed as a number of storage blocks of virtual storage device 20. The write operation 402 also includes a block parameter 408. The value of the block parameter 408 identifies which one of the storage blocks 202, 204, 206 or 208 in virtual storage device 20 the unit of data 404 should be written to. A combination of the data size parameter 406 and the block parameter 408 for a specific write operation is referred to as a parameter-tuple for the write operation 402. In operation, the write operation 402 results in data unit 404 being written to virtual storage device 20 starting at the storage block identified by block parameter 408. As will be familiar to those skilled in the art, where a unit of data larger than the capacity of a storage block is written to an initial storage block in a storage device, a collection of sequential storage blocks commencing with the initial storage block is used to store the unit of data.

In order for the storage appliance 1062 to provide stripe aligned write operations to the virtual storage device 20 using memory 10622, it is necessary to configure storage appliance 1062 with an appropriate stripe size attribute 10624 and stripe alignment attribute 10626 for the RAID controller 1082. These parameters are determined by the storage appliance 1062 by analysing the performance of a series of write operations to the virtual storage device 20, with each write operation having a different parameter-tuple. In the preferred embodiment these write operations take place when the RAID storage system 108 is otherwise idle.

Figure 5:
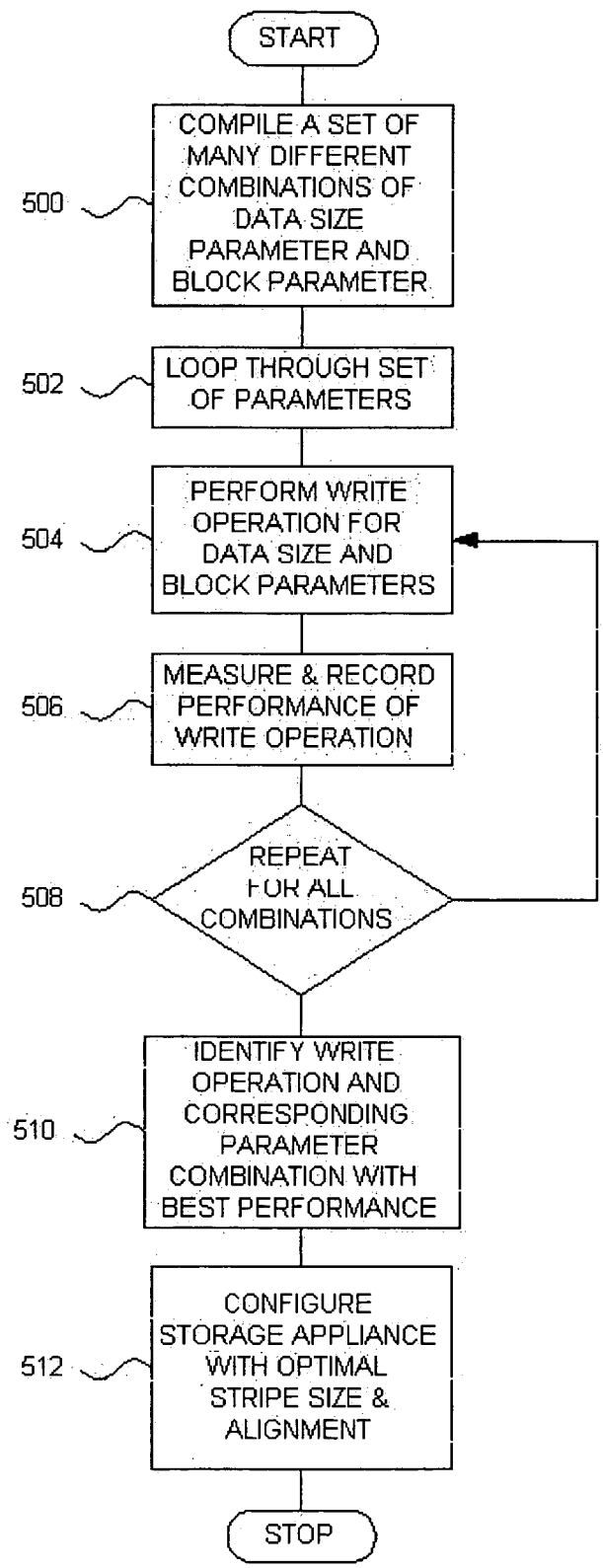
FIG. 5 is a flowchart illustrating a method for configuring the storage appliance of FIG. 1 to provide stripe aligned write operations to the virtual storage device of FIG. 2.

FIG. 5 is a flowchart illustrating a method for configuring the storage appliance 1062 of FIG. 1 to provide stripe aligned write operations to the virtual storage device 20 of FIG. 2. The method of FIG. 5 is carried out by storage appliance 1062 and involves repeated write operations to the virtual storage device 20. At step 500, a set of many parameter-tuples is compiled, with each parameter-tuple comprising a different combination of data size parameter 506 and block parameter 508. Step 502 initiates a loop through each parameter-tuple in the set of parameter-tuples. At step 504, for each parameter-tuple the storage appliance 1062 performs a write operation to the virtual storage device 20 with the parameter-tuple as write parameters. At step 506 a performance measurement of the write operation is made and recorded. In the preferred embodiment the performance measurement includes measuring the time it takes to complete the write operation of step 504. The performance measurement may be recorded to a storage device of storage appliance 1062 such as a random access memory (not shown). Step 508 continues the loop through each parameter-tuple. At step 510, the write operation with the best performance is identified from the record of the performance of each write operation. In the preferred embodiment, the write operation with the best performance is determined to be the write operation which takes the least time to complete. In identifying the write operation with the best performance, a corresponding parameter-tuple is identified. Subsequently at step 512 the storage appliance 1062 is configured such that the value of the stripe size 10624 is set to be the value of the data size parameter 406 of the write operation with the best performance, and the value of the stripe alignment 10626 is configured to be the block parameter 408 of the write operation with the best performance.

Configuring the storage appliance 1062 with stripe size 10624 and stripe alignment 10626 parameters in accordance with the parameter-tuple of the write operation with the best performance provides for storage appliance 1062 to stripe align write operations using memory 10622 as a cache. Stripe aligned write operations by storage appliance 1062 will not encounter the read-modify-write problem resulting in improved I/O performance.

By way of example the method of FIG. 5 will now be considered for a set of three parameter-tuples outlined in the table below.

| Parameter-Tuple | Data Size Parameter 406 | Block Parameter 408 |
| --- | --- | --- |
| Q | Three blocks | Block 204 in virtual storage device 20 |
| R | Two block | Block 202 in virtual storage device 20 |
| S | Four blocks | Block 202 in virtual storage device 20 |

At step 500, a set of parameter-tuples Q, R and S are defined as outlined in table 1. Step 502 initiates a loop through each parameter-tuple, commencing with parameter-tuple Q. At step 504, the storage appliance 1062 performs a write operation to the virtual storage device 20 with the parameter-tuple Q as write parameters. Thus a write operation takes place wherein three blocks of data are written at storage block 204 in virtual storage device 20. Referring now to FIG. 2, the write operation for parameter-tuple Q results in data being written to storage blocks 204, 206 and 208 in virtual storage device 20. The write operation is translated to a write operation across the array of storage devices 1084 by RAID controller 1082. Referring now to FIG. 3, the write operation for parameter-tuple Q results in data being written to storage block 204 of strip 302, and storage blocks 206 and 208 of strip 322 in the array of storage devices 1084. Consequently, the entire stripe 36 is not written (storage block 202 is not written) and the parity strip 342 must be updated to reflect the changes to storage blocks 204, 206 and 208 using the read-modify-write process. The updating of the parity strip has the effect of increasing the time required to complete the write operation for parameter-tuple Q, and so reducing the performance of the write operation which is measured and recorded at step 506. At step 508 the loop continues to the next parameter-tuple R as outlined below.

At step 504, the storage appliance 1062 performs a write operation to the virtual storage device 20 with the parameter-tuple R as write parameters. Thus a write operation takes place wherein two blocks of data are written at storage block 202 in virtual storage device 20. Referring now to FIG. 2, the write operation for parameter-tuple R results in data being written to storage blocks 202 and 204 in virtual storage device 20. The write operation is translated to a write operation across the array of storage devices 1084 by RAID controller 1082. Referring now to FIG. 3, the write operation for parameter-tuple R results in data being written to storage blocks 202 and 204 of strip 302 in the array of storage devices 1084. Consequently, the entire stripe 36 is not written (storage blocks 206 and 208 are not written) and the parity strip 342 must be updated to reflect the changes to storage blocks 202 and 204 using the read-modify-write process. The updating of the parity strip has the effect of increasing the time required to complete the write operation for parameter-tuple R, and so reducing the performance of the write operation which is measured and recorded at step 506. At step 508 the loop continues to the next parameter-tuple S as outlined below.

At step 504, the storage appliance 1062 performs a write operation to the virtual storage device 20 with the parameter-tuple S as write parameters. Thus a write operation takes place wherein four blocks of data are written at storage block 202 in virtual storage device 20. Referring now to FIG. 2, the write operation for parameter-tuple S results in data being written to storage blocks 202, 204, 206 and 208 in virtual storage device 20. The write operation is translated to a write operation across the array of storage devices 1084 by RAID controller 1082. Referring now to FIG. 3, the write operation for parameter-tuple S results in data being written to storage blocks 202 and 204 of strip 302, and storage blocks 206 and 208 of strip 322 in the array of storage devices 1084. Consequently, the entire stripe 36 is written and the parity strip 342 is calculated by RAID controller 1082. As the read-modify-write problem is not encountered for the write operation for parameter-tuple S, performance of the write operation is high which and is measured and recorded at step 506. At step 508 the loop terminates as all three parameter-tuples Q, R and S have been processed.

At step 510, the write operation with the best performance is identified from the record of the performance of each write operation. In this example, the write operations for parameter-tuples Q and R encounter the read-modify-write problem and are consequently of low performance. The write operation for the parameter-tuple S does not encounter the read-modify-write problem and is consequently the write operation with the highest performance as it takes the least time to complete. Subsequently at step 512 the storage appliance 1062 is configured such that the value of the stripe size 10624 is set to be the value of the data size parameter 406 of the write operation with the best performance, and the value of the stripe alignment 10626 is configured to be the block parameter 408 of the write operation with the best performance. Thus, the value of stripe size 10624 is set to be the size of four blocks, and the value of stripe alignment 10626 is set to be block 202 in virtual storage device 20.

While the preferred embodiments have been described here in detail, it will be clear to those skilled in the art that many variants are possible without departing from the spirit and scope of the present invention.

The invention claimed is:

1. A storage appliance comprised of a first interface for being coupled to a host and a second interface for being coupled to a virtual storage device, said storage appliance further comprising a controller operating in accordance with a computer program comprised of program instructions stored on a controller readable media, said program instructions comprised of:

first program instructions to generate a set of parameter-tuples, each parameter-tuple of the set comprising a data unit and a different combination of a data size parameter and a block parameter;

second program instructions, responsive to each parameter-tuple in the set of parameter-tuples, to perform a write operation to the virtual storage device with the parameter-tuple as write parameters, and to make and record a performance measurement of the write operation; and third program instructions to identify a parameter-tuple associated with a write operation having a best recorded performance measurement, and to configure the storage appliance such that a value of a stripe size attribute associated with the virtual storage device is set to the value of the data size parameter of the identified parameter-tuple, and such that a value of a stripe alignment attribute associated with the virtual storage device is set to the value of the block parameter of the identified parameter-tuple.

2. A storage appliance as in claim 1, where configuring the storage appliance results in the storage appliance performing stripe aligned write operations using a storage appliance memory as a cache.

3. A storage appliance as in claim 1, where making a performance measurement comprises measuring an amount of time required to complete the write operation.

4. A storage appliance as in claim 1, where identifying the parameter-tuple associated with the write operation having the best recorded performance measurement comprises identifying the write operation that takes a least amount of time to complete.

5. A storage appliance as in claim 1, where said virtual storage device comprises a RAID storage system that includes a RAID controller coupled to a plurality of storage devices.

6. A storage appliance as in claim 1, where said storage appliance comprises a part of a switch of a storage area network.

7. A storage appliance as in claim 1, where at least said second and third program instructions are executed when said storage appliance is otherwise idle.

8. A storage appliance as in claim 1, further comprising a memory for being coupled to said virtual storage device, where said memory comprises a cache.

9. A storage appliance as in claim 1, further comprising a memory for being coupled to said virtual storage device, where said memory comprises an input buffer.

10. A storage appliance as in claim 1, further comprising a memory for being coupled to said virtual storage device, where said memory comprises an output buffer.

11. A storage appliance comprised of a first interface for being coupled to a host and a second interface for being coupled to a virtual storage device, said storage appliance further being comprised of means for generating a set of parameter-tuples, each parameter-tuple of the set comprising a data unit and a different combination of a data size parameter and a block parameter; means, responsive to each parameter-tuple in the set of parameter-tuples, for performing a write operation to the virtual storage device with the parameter-tuple as write parameters, and for making and recording a performance measurement of the write operation;

and means for identifying a parameter-tuple associated with a write operation having a best recorded performance measurement, and for configuring the storage appliance such that a value of a stripe size attribute associated with the virtual storage device is set to the value of the data size parameter of the identified parameter-tuple, and such that a value of a stripe alignment attribute associated with the virtual storage device is set to the value of the block parameter of the identified parameter-tuple.

12. A storage appliance as in claim 11, where operation of said means for configuring the storage appliance results in the storage appliance performing stripe aligned write operations using a storage appliance memory as a cache.

13. A storage appliance as in claim 11, where said means for making a performance measurement measures an amount of time required to complete the write operation.

14. A storage appliance as in claim 11, where said means for identifying the parameter-tuple associated with the write operation having the best recorded performance measurement operates to identify the write operation that takes a least amount of time to complete.

15. A storage appliance as in claim 11, where said virtual storage device comprises a RAID storage system that includes a RAID controller coupled to a plurality of storage devices.

16. A storage appliance as in claim 11, where said storage appliance comprises a part of a switch of a storage area network.

* * * * *